Dec. 15, 1970  A. L. JOHNSON  3,548,403
MONITORING SYSTEM
Filed June 12, 1967  2 Sheets-Sheet 1
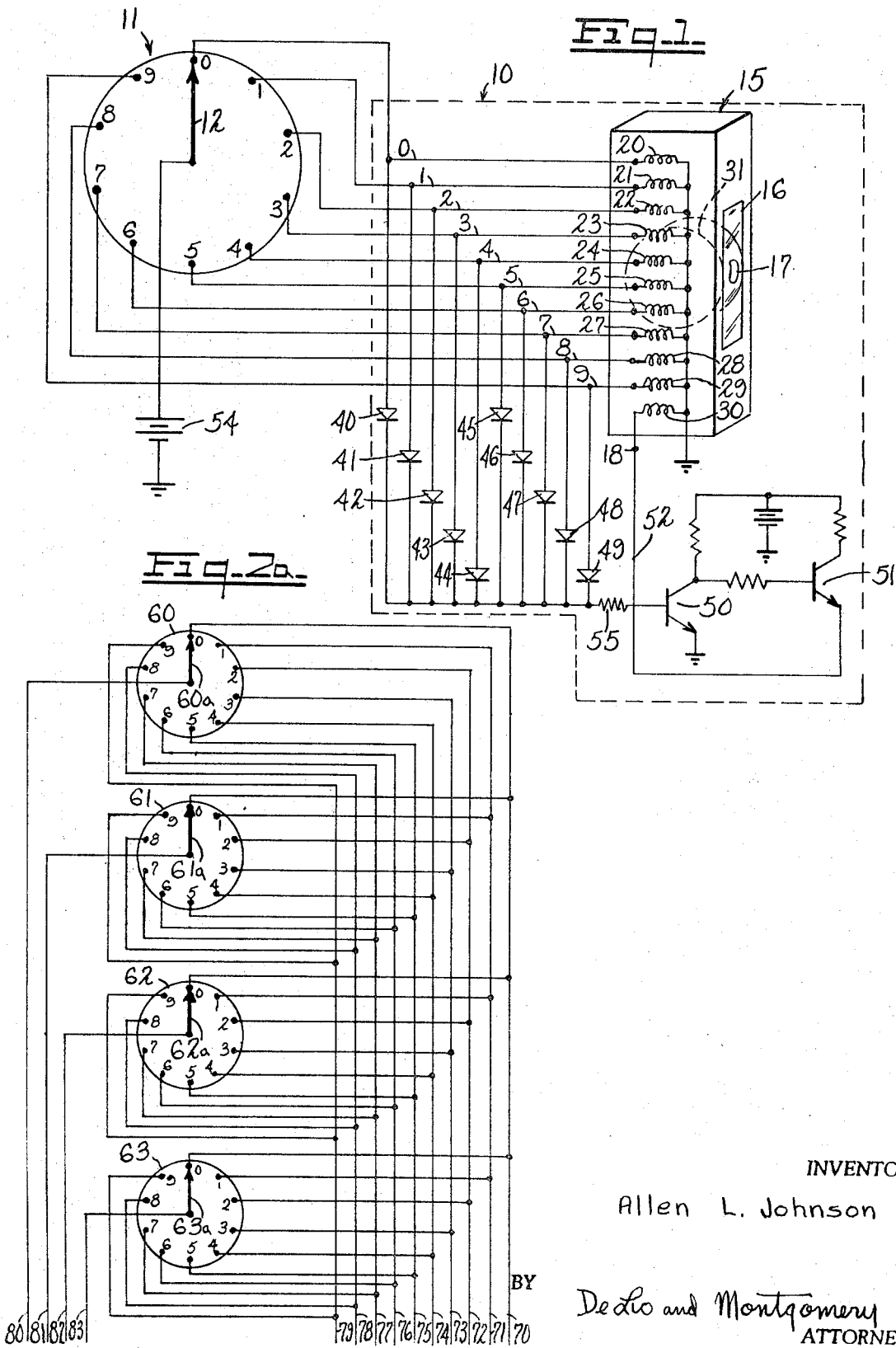
INVENTOR
Allen L. Johnson
BY
DeLio and Montgomery
ATTORNEYS

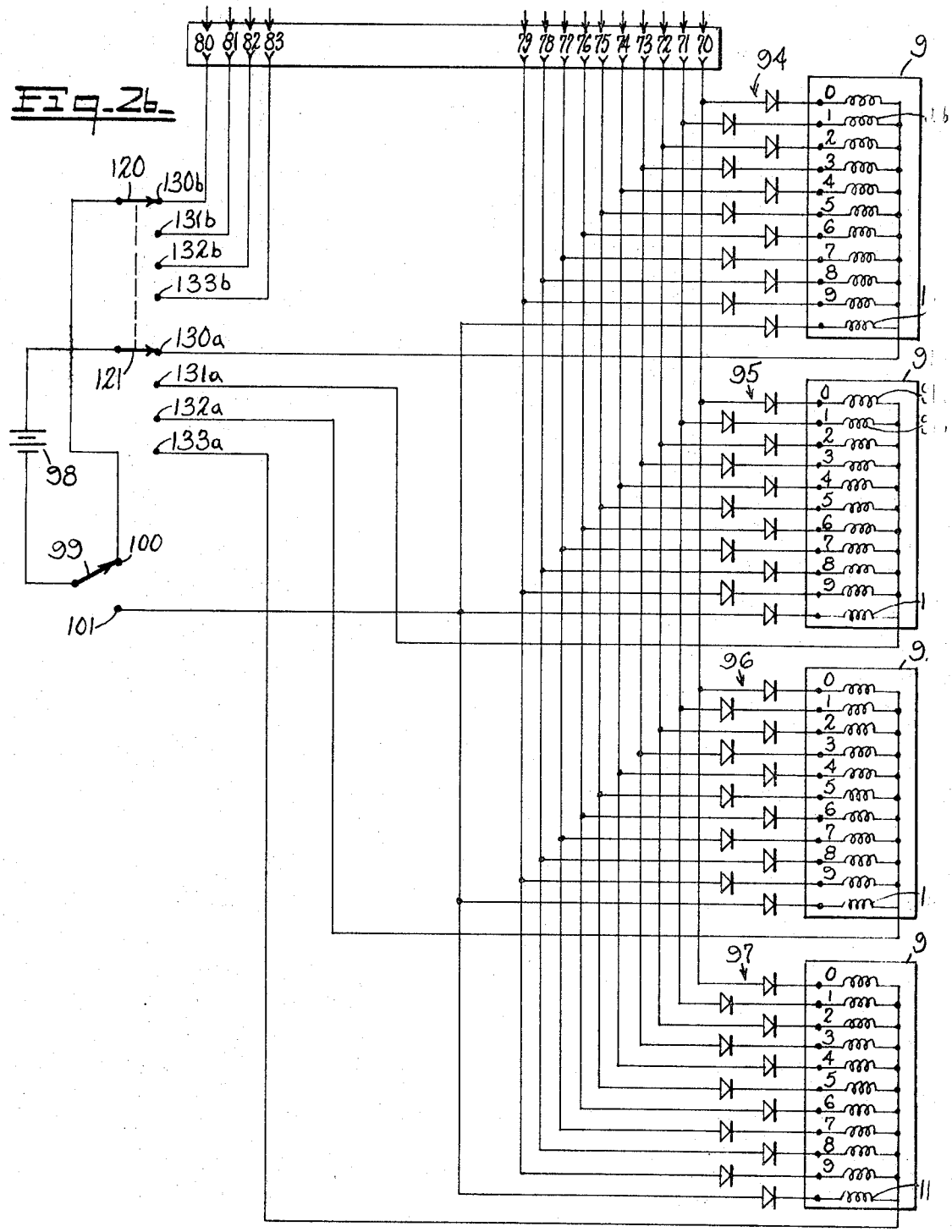

United States Patent Office 3,548,403
Patented Dec. 15, 1970

3,548,403
MONITORING SYSTEM
Allen L. Johnson, Meriden, Conn., assignor to Ripley Company, Inc., Middletown, Conn., a corporation of New York
Filed June 12, 1967, Ser. No. 645,429
Int. Cl. G08b 5/26, 11/00
U.S. Cl. 340—324                             6 Claims

ABSTRACT OF THE DISCLOSURE

A device for displaying information collected from a plurality of common data lines coupled to a plurality of metering registers, comprising a plurality of indicators, each of said indicators having a plurality of coils for causing different symbols to be displayed, a coil of each of said indicators coupled to a different one of said common data lines at one end, all the coils of each individual indicator coupled together at their other ends, a substantially unidirectional current-passing device coupled between each common data line and each coil, and control means for causing a current to flow from a source of energy through one of said metering registers over one of said common data lines through one of said coils and back to said control means.

---

This invention relates to an interrogating device for displaying information registered on a meter such as the usual type of commercial or residential watt-hour meter, gas meters, water meters, and the like. Specifically, this invention relates to a read-out display device which may be utilized for sensing electrically the information stored on an auxiliary meter attached to the existing meter mechanism of the usual commercial or residential watt-hour meter, or from the existing meter itself if it is adapted for this purpose.

The purpose of this invention is to provide a simple and economical device for use by a meter reader making his rounds of commercial or residential installations which use electricity, gas, water, and the like.

The device of this invention is intended for use in conjunction with an overall metering system for a utility, wherein each installation serviced by the utility is provided with an auxiliary metering mechanism which registers the amount of electricity, fuel, water, etc., consumed at the installation.

Electric circuit means are provided and coupled to the metering mechanism. The electric circuit means are generally positioned on the outside of the installation (i.e. home or factory), whereby the meter reader would not have to enter the place of installation to take a reading. By the use of a probe, a meter reader can couple the meter reading device of this invention electrically to the metering mechanism to permit the readings on the meter mechanism to be displayed and thereafter recorded by the meter reader for use at the home office in making billings.

Accordingly, it is an object of this invention to provide a new and improved read-out and display device.

Another object of this invention is to provide a new and improved interrogation and display device which will indicate when the meter mechanism being read out is not properly functioning.

Another object of this invention is to provide a new and improved interrogation and display device adapted to read out a plurality of decades of information from a meter mechanism.

Still other objects and advantages of the invention will in part be obvious and will in part be apparent from the specification.

The invention therefore comprises the features of construction, combination of elements and arrangements of parts which will be exemplified in the constructions hereinafter set forth and the scope of the invention will be indicated in the claims.

For a fuller understanding of the invention, reference is had to the following description, taken in conjunction with the accompanying drawings, in which FIG. 1 is a schematic diagram of the meter read-out and display device of this invention; and FIGS. 2a and 2b are schematic diagrams of another embodiment of this invention for reading out a plurality of decades of information from a plurality of registers of a metering mechanism.

Referring to FIG. 1, there is shown schematically an interrogating and read-out device 10. The circuitry within the device 10 of this invention is shown within the dotted block. The metering mechanism being sampled is shown schematically at 11 and includes a plurality of contacts 0–9 and a wiper arm 12 for engaging the contacts. The mechanism 11 could be of the type disclosed in U.S. Pat. 3,195,814 issued July 20, 1965, to R. A. Steinkamp and assigned to the assignee of this invention. This patent disclosed an auxiliary metering mechanism for use with the conventional type of metering mechanisms found in utility meters (see U.S. Pat. 3,006,712). The 10-position contacts shown correspond to the readings 0–9 obtainable by observing present-day utility meters.

In order to couple the interrogating and display device 10 of this invention to the metering mechanism 11, an electrical probe and connector of the type disclosed in U.S. Pat. 3,222,471 issued Dec. 7, 1965, to R. A. Steinkamp and also assigned to the assignee of this invention, may be utilized. The connector (not shown) would be connected to the contacts from the meter mechanism 11 as well as to the wiper arm 12 and would be placed in a location easily accessible for the meter reader. The probe, such as shown in Pat. 3,222,471, would be electrically coupled to the contacts 0–9 and the wiper arm contact 12.

In this manner, the interrogating device of this invention could be plugged into a connector which is coupled to a metering mechanism, such that the information registered on the metering mechanism 11 may read out and then display.

Referring now to the block 10, there is shown a digital indicator 15 having a window 16 for displaying information at 17, such as a symbol (or numeral) 0, as illustrated in FIG. 1. The indicator 15 of this invention is preferably of the Series 1400 type sold under the trademark Magneline by Patwin Electronics Div. of Patent Button Company, Waterbury, Conn., and disclosed in U.S. Pats. 2,943,313 and 3,009,140. The digital indicator 15 is constructed such that it has 10 input leads 0–9 and an input lead shown at 18. The leads 0–9 are connected to coils shown at 20–29 and the lead 18 is connected to a coil shown at 30. The coils 20–30 are connected at their opposite ends to a common circuit which is grounded. When actuated by a direct current, the coils 20–30 cause a drum 31 within the indicator 15 to rotate so as to display numerical representations or symbols at 17 or a blank or other symbol if the coil 30 is energized.

As shown in FIG. 1, as part of this invention, there is provided a plurality of diodes 40–49. Each of these diodes is connected to one of the data lines 0–9. The purpose of these diodes is to provide a signal to control a pair of transistors shown at 50 and 51, respectively. These transistors provide a signal along the line shown at 52 to the coil 30 to cause a blank to be displayed at 17, in order to indicate that there is no signal present on any of the data lines 0–9. This will occur whenever there is a failure somewhere within the system being read out, for example, if the wiper arm is hung up between the contacts 0 and 1. Thus, the purpose of the diodes 40–49 as well as the transistors 50 and 51, is to cause the display 15 to indicate to the user that there is something wrong within the metering mechanism being read out and to indicate that the metering mechanism must be repaired.

The operation of transistors 50 and 51 is as follows: a positive signal is supplied through the diodes 40 and 49 whenever the wiper arm 12, coupled to a battery 54, is positioned on one of contacts 0–9. The positive signal passes through the diode through an input coupling resistor 55 to the base of the transistor 50, which causes transistor 50 to turn on and provides a signal from its collector to maintain the transistor 51 in an off condition. Thus, the coil 30 is not energized and the information being read from the metering mechanism 11 will be displayed at 17.

Assuming that there is no signal present on any of the data lines 0–9, the transistor 50 will turn off and the transistor 51 will be turned on, thereby providing DC current flow through to energize the coil 30 and cause a symbol or a blank to be displayed at 17 to indicate to the reader of the device that the metering mechanism is not functioning properly. In this manner, the metering mechanism 11 may be monitored or checked out periodically by a supervisory meter reader who could then enter the installation and repair the metering mechanism, if necessary.

Reference is now made to FIGS. 2a and 2b, which represent in schematic form the recording and display device of this invention for reading 4 decades or registers of a metering mechanism. As is well known, most of the present day utility meter mechanisms for residential use comprise four registers, shown at 60–63, for registering units, tens, hundreds and thousands, respectively. These devices are shown in the aforemtntioned Pat. 3,195,814, particularly in FIG. 1 thereof. The unit 60 would register units, unit 61 would register tens, unit 62 would register hundreds and 63 would be utilized for registering thousands.

The contacts 0–9 in each unit 60–63 are electrically conductive. Additionally, an electrically conducting wiper arm 60a–63a, is provided on each of the metering mechanisms. The portion of the schematic drawing, FIG. 2b, represents the read-out and display device according to the invention, for reading four decades of information over nine common input lines 70–79, respectively. These input lines are coupled to the connections for the metering mechanisms 60–63 by the use of a connector and probe, such as shown in previously-mentioned Pat. 3,222,471. Additionally, energization lines 80–83 are provided for energizing the wiper arms 60a–63a, respectively.

Referring now to FIG. 2b, indicators 90–93 are shown. These indicators are preferably of the same type as indicator 15 shown in FIG. 1. As mentioned before, each of these indicators is provided with a display window (not shown) in which numbers are displayed indicative of the information registered on the metering mechanisms 60–63, respectively. As may be seen, the lines 70–79 are coupled to each of the indicators 90–93 through four sets of diodes shown generally at 94–97, respectively. These diodes are connected between lines 70–79 and the input contacts of the indicators 90–93, rather than in the lines 70–79. As mentioned previously, with respect to FIG. 1, each of these indicators is provided with coils connected to the inputs 0–9 and the blank input and thence to ground, or common. The coils control a magnetically actuated drum so as to position the drum to indicate the reading detected from the metering mechanisms 60–63, respectively. The purpose of the diodes 94–97 will be described with reference to the operation of the system, later in the specification.

There is also shown in FIG. 2b a battery 98, which has its positive side connected to a two-position switch wiper arm 99, which moves between one contact shown at 100 and another contact 101. The contact 101 is utilized to clear each of the indicators 90–93 by energizing the blanking coils, shown at 110–113, respectively. This is to insure that the indicators are clear prior to utilizing the device for recording the information registered in the metering mechanisms 60–63, respectively. The contact 100 is coupled to an additional ganged switch having wiper arms 120 and 121. In this manner, the positive side of the battery 98 is coupled to the contact 120 and the negative or common side of the battery 98 is connected to the contact 121. Upon moving the ganged switch having wiper arms 120 and 121 between contacts 100, 130a, 130b, 131a, 131b, 132a, 132b, 133a and 133b, it is possible to select the common from the indicators 90–93 and to select the lines 80–83, to selectively energize wiper arms 60a–63a, respectively. In this manner, by manipulating the ganged switch 120 and 121 and positioning the wiper arm 129 on contact 100, it is possible to selectively read out the units, tens, hundreds and thousands registered on the metering mechanisms 60–63.

In operation, assuming that the contact wiper arms 120 and 121 are on contacts 130a and 130b, the unit device 60 will be chosen to be read out and, additionally, the common of the indicator 90 will be selected. Assuming that the wiper arm 63a is in the zero position, as shown, on the metering mechanism 60, a positive signal will then be applied through the first diode of the group 94 to energize topmost coil in the indicator 90 so as to display a zero. Although there appears to be no reason for the diodes shown at 94–97, applicant has discovered that if the groups of diodes 94–97 were not present, each of the zero positions in the other indicators 9–93 would also be selected at the same time. This would be the result of the positive signal on the zero or 70 line simultaneously passing through coil 91a, thence back through any of the coils such as coil 91b, back over line 71, thence through relay coil 90b, back through the common. By the use of the groups of diodes 94–97, respectively, this will not occur since the diodes as connected will not permit a positive signal to be fed back through coil 91b, thence back through coil 90b to the common or ground.

It will be seen, therefore, that with the use of the diodes shown, it is possible to read out a plurality of metering mechanisms over common data lines into a bank or plurality of indicators tied together, without energizing or causing the same numeral to be displayed on each of the indicator units.

It will thus be seen that the objects set forth above, among those made apparent from the preceding description, are efficiently attained and since certain changes may be made in the foregoing construction without departing from the spirit and scope of the invention, it is intended that all matter contained in the above description or shown in the accompanying drawings, shall be interpreted as illustrative and not in a limiting sense.

It is also to be understood that the following claims are intended to cover all the generic and specific features of the invention herein described and all statements of the scope of the invention which, as a matter of language, might be said to fall therebetween.

What is claimed is:

1. In a system for reading out information stored in a metering mechanism where the mechanism includes a plurality of electrical contacts which are adapted to be energized in accordance with information stored in the mechanism and where one of the contacts is always energized upon application of an electrical potential to the mechanism under normal operation, the improvement comprising a display device for displaying a plurality of symbols indicative of the information represented by the energized contacts, coupling means including a plurality of channels for electrically connecting said metering mechanism contacts to said display means, means for applying an electrical potential across said contacts and said display means over said channels, said display means including additional indicating means for indicating a metering mechanism fault, circuit means coupled to said each of said channels for sensing the absence of a signal in all of said channels when the electrical potential is applied, said circuit means including means responsive to sensing the absence of a signal in all of said channels for applying a signal to said additional indicating means to cause said display means to indicate that none of the contacts of the metering mechanism is energized.

2. A system according to claim 1, wherein said indicator symbols are numerals from 0 to 9, and wherein said contacts and said plurality of channels number 10, one of said channels being connected to each of ten separate indicator positioning means of said indicator means for causing said numerals to be displayed.

3. A system for displaying information stored in a plurality of metering registers in a like plurality of display devices where each register includes a plurality of electrical contacts which are adapted to be energized in accordance with information stored in the registers and where one of the contacts is always energized upon application of an electrical potential to the register under normal operation; the improvement comprising a plurality of common data lines connected to said register contacts, each of said display devices having a plurality of coils arranged to be energized through a different one of said data lines from an energized contact and an additional coil adapted upon energization thereof to display the absence of a signal on any of the contacts of an associated register, energization of each coil of a display device being effective to cause said device to display a corresponding symbol, a unidirectional conducting device coupled in circuit with each of said coils at one end thereof, the coils of each display device being coupled together at their other ends, switching means for sequentially applying an electrical potential across the contacts of each register and the coils of an associated display device over said common data lines, circuit means coupled to each of said data lines to sense the absence of a signal on all of said data lines when an electrical potential is applied across the contacts of a register, said circuit upon sensing the absence of a signal on said data lines being effective to energize said additional coil of the display device connected to the associated register.

4. A system according to claim 3 in which the symbols are numerals positioned about a drum, said drum being positionable in response to a current flowing through one of said coils.

5. A system according to claim 4, in which the coil controlling the display of the same numeral in each indicator is coupled to the same common data line.

6. A system according to claim 3 further including means for resetting the indicator after use, such that the device is once again ready for making a reading.

References Cited

UNITED STATES PATENTS

| | | | |
|---|---|---|---|
| 1,492,913 | 5/1924 | Wood | 340—325 |
| 3,202,968 | 8/1965 | Eady Jr., et al. | 340—176 |
| 3,375,512 | 3/1968 | Watkins et al. | 340—176 |

OTHER REFERENCES

Digital Computer Fundamentals, 2nd edition, T. C. Bartee, Copyright 1960, 1966, McGraw-Hill Book Co.

ALVIN H. WARING, Primary Examiner

M. M. CURTIS, Assistant Examiner

U.S. Cl. X.R.

340—176, 325